United States Patent
Giese et al.

(10) Patent No.: US 9,206,866 B2
(45) Date of Patent: Dec. 8, 2015

(54) BRAKE LINING ARRANGEMENT FOR A DISK BRAKE AND METHOD FOR PRODUCING A BRAKE LINING ARRANGEMENT

(75) Inventors: Hans-Martin Giese, Polch (DE); Xueming Chen, Ahrensburg (DE); Sylvester Lindemann, Koblenz (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 13/983,890

(22) PCT Filed: Jan. 12, 2012

(86) PCT No.: PCT/EP2012/000129
§ 371 (c)(1),
(2), (4) Date: Sep. 6, 2013

(87) PCT Pub. No.: WO2012/107155
PCT Pub. Date: Aug. 16, 2012

(65) Prior Publication Data
US 2013/0333991 A1 Dec. 19, 2013

(30) Foreign Application Priority Data
Feb. 10, 2011 (DE) .......................... 10 2011 010 912

(51) Int. Cl.
*F16D 65/092* (2006.01)
*F16D 69/00* (2006.01)

(52) U.S. Cl.
CPC ........ *F16D 65/092* (2013.01); *F16D 2069/004* (2013.01); *Y10T 83/0259* (2015.04)

(58) Field of Classification Search
CPC . F16D 65/092; F16D 2069/004; B24B 9/002; B24B 19/28
USPC ...... 188/251 R, 250 B, 251 A, 264 B, 250 G, 188/250 R, 71.1; D12/180
See application file for complete search history.

(56) References Cited

U.S. PATENT DOCUMENTS

| 3,523,595 A | * | 8/1970 | Willi | ........................ | F16D 69/00 188/251 R |
| 5,535,859 A | | 7/1996 | Zeng | | |

(Continued)

FOREIGN PATENT DOCUMENTS

| DE | 29817467 U1 | 2/2000 |
| DE | 10044875 A1 | 3/2002 |

(Continued)

OTHER PUBLICATIONS

International Search Report from International Application No. PCT/EP2012/000129 dated Apr. 11, 2012.

*Primary Examiner* — Anna Momper
*Assistant Examiner* — San Aung
(74) *Attorney, Agent, or Firm* — MacMillan, Sobanski & Todd, LLC

(57) ABSTRACT

A brake lining arrangement for a disk brake, and a method for producing such a brake lining arrangement, comprises a brake lining carrier and a friction pad mounted thereon, a friction surface of which can be attached to a disk brake for generating a friction effect. In at least one border area, the friction pad is provided with a bevel, which at one bevel edge transitions into the friction surface. In order to simplify production, the bevel edge is configured to extend in a curved line.

7 Claims, 1 Drawing Sheet

(56) References Cited

U.S. PATENT DOCUMENTS

| | | | |
|---|---|---|---|
| 5,613,898 A * | 3/1997 | Lumen | B24B 9/002 451/190 |
| 5,622,785 A * | 4/1997 | Gaylor | F16D 65/0006 188/251 A |
| 5,856,390 A | 1/1999 | Gaylor et al. | |
| 7,275,625 B2 | 10/2007 | Oi et al. | |
| 7,416,476 B2 | 8/2008 | Tokoyama et al. | |
| D596,544 S * | 7/2009 | Liu | D12/180 |
| 2004/0038630 A1* | 2/2004 | Yokoyama | B24B 9/002 451/57 |
| 2009/0032343 A1* | 2/2009 | Liu | F16D 65/0006 188/250 B |

FOREIGN PATENT DOCUMENTS

| | | |
|---|---|---|
| DE | 102004026853 A1 | 1/2006 |
| DE | 102009008769 B3 | 4/2010 |
| EP | 1369199 A1 | 12/2003 |
| GB | 1302745 A | 1/1973 |
| JP | 2004324763 A | 11/2004 |

\* cited by examiner

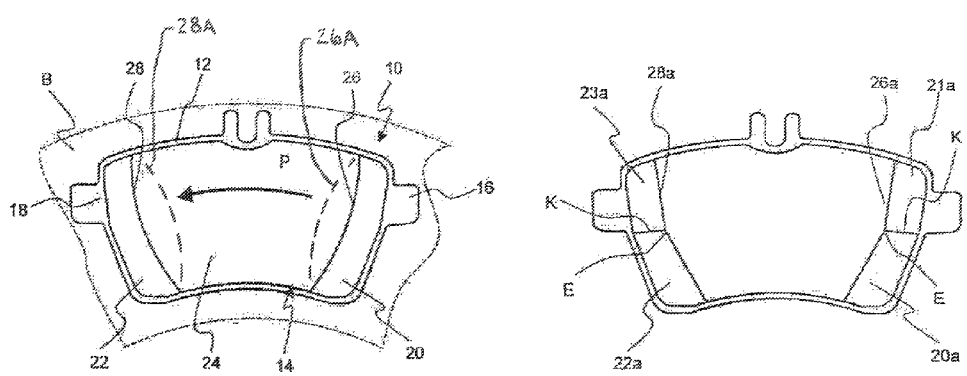
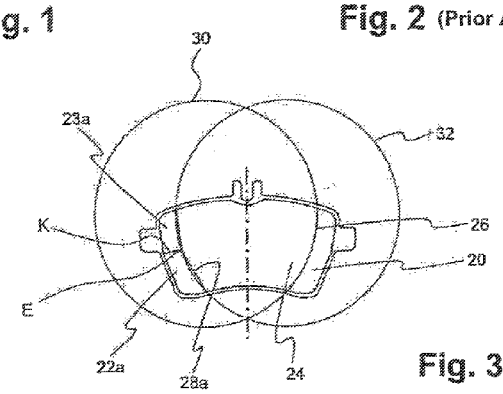
Fig. 1  Fig. 2 (Prior Art)
Fig. 3

BRAKE LINING ARRANGEMENT FOR A DISK BRAKE AND METHOD FOR PRODUCING A BRAKE LINING ARRANGEMENT

CROSS-REFERENCE TO RELATED APPLICATIONS

This application is a national stage of International Application No. PCT/EP2012/000129 filed Jan. 12, 2012, the disclosures of which are incorporated herein by reference in entirety, and which claimed priority to German Patent Application No. DE 10 2011 010 912.9 filed Feb. 10, 2011, the disclosures of which are incorporated herein by reference in entirety.

BACKGROUND OF THE INVENTION

The present invention relates to a brake pad arrangement for a disc brake and to a method for producing such a brake pad arrangement. The brake pad arrangement comprises a brake pad carrier and a friction pad which is attached thereto and can be laid with a friction surface against a brake disc of the disc brake to obtain a friction effect, the friction pad being provided with a chamfer in at least one border region, which chamfer merges into the friction surface at a chamfer edge.

Brake pad arrangements of this type are known from the prior art. Thus, it has been realized that the provision of chamfers in the border region of the respective friction pads constitutes an effective measure for combating noise emissions which may occur during braking. Undesired noise emissions of this type are caused, for example, by friction-induced vibrations of the brake pad arrangement itself or other components of the disc brake arrangement. In the range of the resonant frequencies of the arrangement, clearly audible noises may occur, which are absolutely to be avoided to increase the driving comfort. For this reason, various possibilities for providing chamfers on the brake friction pads of known brake pad arrangements have been provided in the prior art. Thus, the prior art knows chamfers with substantially rectilinear chamfer edges which are free from kinks and which either run parallel to one another or are inclined relative to one another in the manner of segments with respect to the brake disc. According to a development in the prior art, chamfers having a kinked chamfer edge course are provided, so-called diamond chamfers, the term having been chosen based on a diamond cut with cut surfaces inclined relative to one another.

Diamond-shaped chamfers of this type are known, for example, from the document U.S. Pat. No. 5,535,859. Therein, it is described that the friction pad is provided with a chamfer cut both at its leading side and at its trailing side with respect to a rotational movement of a brake disc interacting with the friction pad, in which chamfer cut two chamfer surfaces inclined relative to one another are provided on each side of the friction surface. This configuration of the friction pad admittedly results in a considerable reduction of noise emissions. However, it is problematical in the case of this friction pad geometry that its production is relatively expensive because several grinding machining steps are required to achieve these chamfer surfaces inclined relative to one another. Especially in mass production, which has always to be optimised for economical production of brake pad arrangements of this type, the requirement of several working steps is, however, problematical because it is time-consuming and entails high costs.

A comparable situation is found in the brake pad arrangement according to U.S. Pat. No. 7,275,625 B2. This document too describes a friction pad of a brake pad arrangement with a diamond cut, i.e. with two chamfer surfaces inclined relative to one another and with a kinked course of the chamfer edges, which is subject to the problem of time-consuming and thus costly production. In this prior art, the problems of more simply configured chamfer cuts, in particular with chamfer edges free from kinks and running parallel to one another or v-shaped to one another, are also explained. Both geometries have the problem of comparatively small bearing surfaces and inadequate adaptation to the different circumferential speeds of the brake disc depending on the radius.

The document DE 10 2009 008 769 B3 shows a method and a device for producing brake pad carriers.

BRIEF SUMMARY OF THE INVENTION

A feature of the present invention is to provide a brake pad arrangement for a disc brake of the type described at the outset and a method for producing such a brake pad arrangement, with which an effective noise suppression during a braking procedure is obtained, while at the same time a uniform wear over the entire brake pad is ensured and where the brake pad arrangement is to be produced with less production-related expenditure than the prior art.

This feature is achieved by a brake pad arrangement for a disc brake having the features described at the outset, in which it is provided that the chamfer edge has a curved course.

With the invention, the advantages regarding a uniform wear, which are afforded for example by a friction pad with a diamond chamfer, are associated with the advantages of a simpler production of a rectilinear chamfer edge course by the chamfer edge having a curved course. It is thus possible, in a grinding method for producing the brake pad arrangement according to the invention, in a departure from the production of a diamond chamfer, not to have to carry out a plurality of grinding steps which require a realignment of the grinding machine relative to the friction pad to be machined between the individual grinding steps. Rather, it is sufficient to guide the grinding disc in a continuous movement over the friction pad such that a curved course of the chamfer edge is achieved during this continuous movement. Alternatively, it may also be provided that the friction pad is guided in a continuous movement past the grinding disc. As a result, the geometry of the friction pad can be optimised from the point of view of a uniform wear in a manner similar to that in a diamond cut, while being able to minimise the production expenditure by avoiding a plurality of grinding steps per chamfer.

In the context of the present invention, it is preferably provided that the chamfer edge has a continuously curved course. Kinks in the chamfer edge course are to be avoided according to the invention, which increases the efficiency of the production method.

Preferably, it may be provided according to the invention that the chamfer is formed at a leading side or/and a trailing side of the friction pad, with respect to the direction of rotation of the brake disc. Depending on the needs and in line with the requirements for reduced noise emissions, it is accordingly possible to provide only one of the leading and trailing side of the friction pad or both with a corresponding chamfer.

A development of the invention provides that the chamfer edge has a convexly curved course with respect to the friction surface. The friction surface is therefore of laterally "bulged"

form. Alternatively, it is also possible to form the chamfer edges concavely with respect to the friction surface.

Furthermore, it may be provided according to the invention that the chamfer edge is curved in a circular arc shape. Such a circular arc-shaped curvature of the chamfer edge can be produced with comparatively simple production-related means, in particular with simple grinding machines. Nevertheless, other chamfer edge contours are also conceivable, such as for example ellipses or otherwise curved chamfer edges.

To simplify the production, the chamfer edges are formed geometrically complementary to one another at the leading side with respect to the direction of rotation of the brake disc and at the trailing side with respect to the direction of rotation of the brake disc. Preferably, it may be provided that the chamfer edge has a circular arc-shaped course in each case at the leading side and at the trailing side, the circular arcs being formed with a substantially equal radius.

With regard to a production of the brake pad arrangement according to the invention as simply as possible, it is provided that the chamfer is produced in a single material-removing production step, in which a material-removing tool is guided along a machining path corresponding to the curved course of the chamfer edge.

The invention further relates to a method for producing a brake pad arrangement for a disc brake of the above-described type, the brake pad arrangement having a brake pad carrier and a friction pad which is attached thereto and can be laid with a friction surface against a brake disc to obtain a friction effect, the friction pad being provided with a chamfer in at least one border region, which chamfer merges into the friction surface at a chamfer edge, the chamfer edge being produced in a single material-removing production step, in which a material-removing tool is guided along a machining path corresponding to the curved course of the chamfer edge, or in which the brake pad arrangement is guided along a machining path, corresponding to the curved course of the chamfer edge, relative to a material-removing tool.

In this method, it may be provided that the machining path is of circular arc-shaped or otherwise continuously curved form. Furthermore, it possible according to the invention for the chamfer to be produced in a single grinding machining step.

Other advantages of this invention will become apparent to those skilled in the art from the following detailed description of the preferred embodiment, when read in light of the accompanying drawings.

BRIEF DESCRIPTION OF THE SEVERAL VIEWS OF THE DRAWINGS

FIG. 1 shows a front view of the friction pad of a brake pad arrangement according to the invention;

FIG. 2 shows a corresponding view of a brake pad arrangement according to the prior art;

FIG. 3 shows a comparative illustration for the production of a brake pad arrangement according to the invention and a brake pad arrangement according to the prior art.

DETAILED DESCRIPTION OF THE INVENTION

In FIG. 1, a brake pad arrangement according to the invention is illustrated in a front view of the friction pad and is generally designated by 10. This arrangement comprises a brake pad carrier 12, to which a friction pad 14 is attached. The brake pad carrier 12 has two laterally projecting tabs 16 and 18, by which it is, for example, coupled to a spring arrangement and is displaceably guided in a guide slot of a disc brake arrangement.

The brake pad carrier 14 is of plate-shaped form, for example in the form of a metal plate. It is mountable in the disc brake arrangement, in which a brake disc B (indicated by dashed lines) runs, according to arrow P, past the friction pad held in a rotationally fixed manner. The friction pad 14 has two chamfers 20, 22, between which a friction surface 24 is arranged. The friction surface 24 comes into contact with the brake disc B to obtain a braking effect. The chamfer 20 is thus arranged in the leading region of the brake pad arrangement 10, with respect to the direction of rotation P of the brake disc, whereas the chamfer 22 is arranged in the trailing region, with respect to this direction of rotation.

It can be seen that the chamfers 20 and 22, which extend at an angle of about 20 to 40° relative to the friction surface 24 (plane of the drawing), each merge with a curved chamfer edge 26, 28 into the friction surface 24. Both chamfer edges 26, 28 are convex with respect to the friction surface 24, i.e. curved outwards. This results in the frictionally effective section of the friction surface 24 being designed with a smaller width in the radially inner region than radially further outwards. This configuration is chosen because the brake disc B has a greater circumferential speed in the radially outer region, which also entails greater wear, than radially further inwards. To avoid differences in wear in the radial direction along the friction surface 24, the friction surface is therefore usually widened in the radially outward direction. Besides avoiding differences in wear, the two chamfers 20, 22 have the effect, known per se, of reducing the noise emission during the braking procedure. Alternatively, it is also possible to form the chamfer edges concavely with respect to the friction surface 24, i.e., curved inwards, as shown by reference characters 26A and 28A in phantom in FIG. 1.

It can be seen, however, that the chamfers 20, 22 are designed to be continuous and each have a continuous course along their curved chamfer edge 26, 28. This results in the chamfer edges 26, 28 being free from kinks, as shown in FIG. 1.

In contrast to this, FIG. 2 shows a friction pad arrangement according to the prior art, in which the same components as in the invention are designated by the same reference symbols, but with the letter a. It can be seen that there the chamfer edges 26a, 28a are provided with a kink K and thus do not have a continuous course. Moreover, it can be seen that the chamfers each have two surface regions 20a, 21a and 22a, 23a which are each separated from one another by an edge E and which have different inclinations. Such a configuration of the chamfers is also called a diamond chamfer, because these chamfers have surfaces running in an inclined manner with respect to one another and having sharp edges, similar to those in a diamond cut. The production of such chamfers 20a, 22a is, of course, in each case relatively expensive, because a grinding disc used for production has to be realigned for each surface section 20a, 21a and 22a, 23a and guided along the rectilinear sections of the chamfer edges 26a, 28a. To produce the four chamfers 20a, 21a and 22a, 23a, the grinding tool thus has to be applied a total of four times.

The situation is different in the case of the invention, as shown in FIG. 1. To explain the differences, reference is additionally made to FIG. 3, which shows a comparison of prior art (left-hand side) and present invention (right-hand side). There, it can be seen that the chamfer 20 according to the present invention is produced with the chamfer edge 26 having a rounded course by the grinding tool being guided along a circular path, so that the rounded chamfer edge 26 which represents a segment of the circle 30 results. By contrast, in FIG. 3, on the left-hand side, it is shown that the diamond chamfer there is formed with a kinked chamfer edge 28a and with the two different regions 22a, 23a inclined with respect to one another in a kinked manner deviating from the circular path 32, and has to be produced by multiple application of the grinding tool.

The comparison according to FIG. 3 shows in a simple manner that in the case of a friction pad arrangement with a diamond chamfer (kinked chamfer curve) according to the prior art a total of at least two additional working steps are required per brake pad arrangement, namely two working steps for each chamfer, whereas according to the present invention for each pad arrangement only one working step per chamfer, i.e. a total of two working steps, are required. As a result, the brake pad arrangement according to the present invention can be produced substantially more cost-effectively and simply than is the case in the prior art. Nevertheless, the same advantages are achieved, namely a marked reduction of the noise emission by providing the chamfers and a uniformity of the wear over the entire friction surface 24 by the convex contour of the chamfer edges 26 and 28.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A brake pad arrangement for a disc brake comprising a brake pad carrier and a friction pad which is attached thereto and is configured to be laid with a friction surface against a brake disc to obtain a friction effect, the friction pad being provided with a chamfer, at least along a border region extending substantially in a radial direction, which chamfer merges into the friction surface at a chamfer edge, wherein the chamfer edge has a continuously curved course extending concavely in a direction substantially parallel to the friction surface, and in that the chamfer is produced in a single material-removing production step, in which a material-removing tool is guided along a machining path corresponding to the curved course of the chamfer edge, or in which the brake pad arrangement is guided along a machining path, corresponding to the curved course of the chamfer edge, relative to the material-removing tool.

2. The brake pad arrangement according to claim 1, wherein the chamfer is formed at a leading side or/and a trailing side of the friction pad, with respect to a direction of rotation of the brake disc.

3. The brake pad arrangement according to claim 1, wherein the chamfer edge is curved in a circular arc shape.

4. The brake pad arrangement according to claim 2, wherein the chamfer edge has a circular arc-shaped course in each case at the leading side and at the trailing side, the circular arcs being formed with a substantially equal radius.

5. A method for producing a brake pad arrangement for a disc brake, the brake pad arrangement having a brake pad carrier and a friction pad which is attached thereto and is configured to be laid with a friction surface against a brake disc to obtain a friction effect, the friction pad being provided with a chamfer, at least along a border region extending substantially in a radial direction, which chamfer merges into the friction surface at a chamfer edge, wherein the chamfer edge is produced in a single material-removing production step, in which a material-removing tool is guided along a machining path corresponding to a curved course of the chamfer edge, or in which the brake pad arrangement is guided along a machining path, corresponding to the curved course of the chamfer edge, relative to the material-removing tool, wherein the curved course of the chamfer edge extends concavely in a direction substantially parallel to the friction surface.

6. The method according to claim 5, wherein the machining path is circular arc-shaped.

7. The method according to claim 5, wherein the chamfer is produced in a single grinding machining step.

\* \* \* \* \*